United States Patent [19]

Schneider

[11] Patent Number: 4,499,461
[45] Date of Patent: Feb. 12, 1985

[54] CIRCUIT ARRANGEMENT FOR CENTRALLY-CONTROLLED TELECOMMUNICATION EXCHANGE SYSTEMS, PARTICULARLY FOR TIME-DIVISION MULTIPLEX TELEPHONE EXCHANGE SYSTEMS, WITH INFORMATION EXCHANGE BETWEEN PBX DEVICES

[75] Inventor: Alfred Schneider, Haar, Fed. Rep. of Germany

[73] Assignee: Siemens Aktiengesellschaft, Berlin & Munich, Fed. Rep. of Germany

[21] Appl. No.: 394,136

[22] Filed: Jul. 1, 1982

[30] Foreign Application Priority Data

Jul. 17, 1981 [DE] Fed. Rep. of Germany ....... 3128365

[51] Int. Cl.$^3$ ........................... H04Q 9/00; H04J 3/16
[52] U.S. Cl. .................................. 340/825.03; 370/85
[58] Field of Search ...................... 340/825.03, 825.04; 370/85

[56] References Cited

U.S. PATENT DOCUMENTS

| | | | |
|---|---|---|---|
| 3,665,110 | 5/1972 | Gerke et al. | 179/18 EA |
| 3,924,081 | 12/1975 | Rohrig et al. | 179/18 EB |
| 4,229,815 | 10/1980 | Cummiskey | 370/85 |
| 4,440,986 | 4/1984 | Thorson | 370/85 |

FOREIGN PATENT DOCUMENTS

| | | |
|---|---|---|
| 1190517 | 12/1965 | Fed. Rep. of Germany . |
| 2816286 | 10/1979 | Fed. Rep. of Germany . |
| 79/2960 | 6/1980 | South Africa . |
| 1040833 | 9/1966 | United Kingdom . |
| 1260769 | 1/1972 | United Kingdom . |
| 1459621 | 12/1976 | United Kingdom . |

OTHER PUBLICATIONS

Besier H., "Der Übergang zum digitalen Ortsnetz", NTZ, vol. 33, No. 10, 1980, pp. 646–652.
Horiki et al., "Design Philosophies on Local Digital Switching Systems", International Zurich Seminar on Digital Communications, Proceedings IEEE, Catalogue No. 78, CH 1325-0 ASST, pp. B2.1–B2.5.
Lucky R. W., "A Flexible Experimental Digital Switching Office", International Zurich Seminar on Digital Communications, Proceedings IEEE, Catalogue No. 78, CH 1325-0 ASST, pp. A4.1–A4.4.
Asmussen et al., "EWSD Digital Switching System", Telcom Report, Special Issue, vol. 4, 1981.

Primary Examiner—Donald J. Yusko
Attorney, Agent, or Firm—Hill, Van Santen, Steadman & Simpson

[57] ABSTRACT

A circuit arrangement for centrally-controlled telecommunication exchange systems, particularly for time-division multiplex telephone exchange systems, with information exchange between sub-central devices, is characterized by the provision of an input/output processor device, in addition to the central control unit, which comprises an input memory portion and an output memory portion. The input memory portion is divided into sub-memories which receive information intended for a line trunk group and to be processed by the central control unit, while the output memory portion is divided into sub-memories which are assigned to respective buffers for information transfer between the sub-central devices, by-passing the central control unit. For the purpose of information transmission from one line trunk group to another, an auxiliary criterion is added to the information to be transmitted in addition to the address of the destination line trunk group, the auxiliary criterion causing the input/output processor device to write the information directly into the output sub-memory of that sub-central device which serves the destination line trunk group.

1 Claim, 1 Drawing Figure

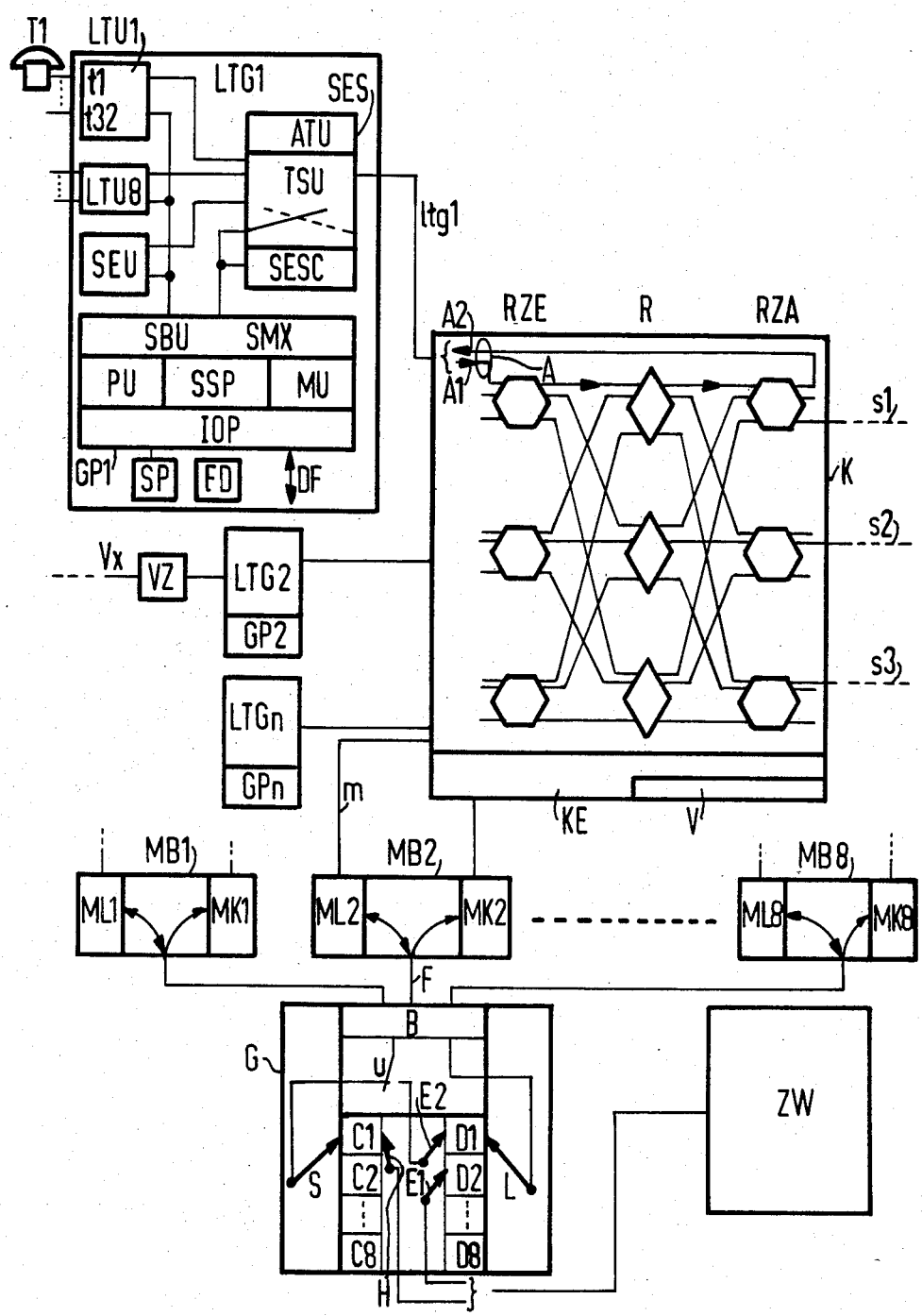

CIRCUIT ARRANGEMENT FOR CENTRALLY-CONTROLLED TELECOMMUNICATION EXCHANGE SYSTEMS, PARTICULARLY FOR TIME-DIVISION MULTIPLEX TELEPHONE EXCHANGE SYSTEMS, WITH INFORMATION EXCHANGE BETWEEN PBX DEVICES

BACKGROUND OF THE INVENTION

1. Field of the Invention

The present invention relates to a circuit arrangement for telecommunication exchange systems, particularly time-division multiplex (TDM) telephone exchange systems, having central control units and sub-central devices which forward information to the respective central control unit and receive information therefrom and which are connected to the central control unit over lines individually associated therewith or over channels with a TDM line individually associated therewith, and in which the central control unit is equipped with an input/output memory and an input/output control device for the information exchange with the sub-central device and for information exchange between sub-central devices.

2. Description of the Prior Art

In centrally-controlled telecommunication exchange systems, the principal of division of control operations to PBX sub-control devices is preferably employed, such as can be derived, for example, from the German published application 28 16 286 and from the art cited therein. In such a system, the transmission of information between a central control unit and each of the sub-control devices, respectively in the one and the other direction, as well as between two of the sub-control devices plays a decisive role. The above publication provides a common data bus for this purpose.

The German Letters Patent No. 11 90 517 provides a central re-transmission control device with a central memory which always first accepts all information to be exchange between the PBX control devices individually from one of the control devices, then intermediately stores the information and subsequently retransmits the same to the appertaining control device. In a manner technically related thereto, the German Letters Patent 28 13 721 provides a plurality of intermediate memories serving the same purpose, of which each can accept information from peripheral control devices and relay the same to a respective sub-control unit. A central bus serves this purpose, and is utilized on a case-by-case basis for information transmission.

The German Letters Patent No. 23 27 669, corresponding to British Specification No. 1,459,621, provides a common data bus for information transmission between a central control unit and sub-control devices (in both direction) as well as between two sub-control devices. The data bus can be seized by the central control unit for information transmission to and from the central control unit. Further, another central distributor is provided which can seize the data bus for information transmissions between two sub-control devices.

Further, a circuit arrangement has been disclosed in the German Letters Patent No. 20 55 745, corresponding to U.S. Pat. No. 3,924,081, in which sub-central devices referred to as buffer memories are connected over information transmission paths individually associated thereto, i.e. are individually connected to the central control unit. The central control unit exhibits an input/output memory which comprises two list storages of which one serves for the input of information from the sub-central devices into the central control unit and the other serves the output of information from the central control unit to the sub-central devices. The individual information transmission paths provided in this known case per sub-central device, insofar as it is a matter of individual lines (as in the previously-specified known case), can have the advantage of more favorable transmission conditions because of the possibility of optimum line matching to the two ends of each of the lines, given which branchings, iterative networks and the like which are more disadvantageous in terms of transmission technology are eliminated. As soon as the individual information transmission paths are a matter of TDM channels, the individual connection of each of the buffer memories to the central control unit has the advantage of better supervision, particularly given a greater plurality of buffer memories, in view of the execution of the information transmission operations for data which, respectively coming from one of the buffer memories, are intended for one of the other buffer memories. However, this is conditioned in the known case in that the data must be intermediately stored in the central control unit memory.

It should be noted that all of the art citations herein are fully incorporated by the respective references thereto.

SUMMARY OF THE INVENTION

The object of the present invention, which proceeds from a circuit arrangement of the type generally set forth above, is to provide a circuit arrangement for telecommunication exchange systems, particularly TDM telephone exchange systems, having central control units and sub-central devices which, on the one hand, forward information to the respective control unit and also receive information therefrom on the other hand, and which are connected to the central control unit over lines individually assigned thereto or over channels of a TDM line individually assigned thereto, and in which the central control unit is equipped with an input/output memory and an input/output control device for the information exchange with the sub-central devices and for information exchange between sub-central devices.

In a circuit arrangement of the type set forth above, i.e. under the precondition that a direct transmission of information from one sub-central device to another sub-central device is not provided over a common data bus, the object of the invention, therefore, is to relieve the central control unit with respect to transmitting that information.

The above object is achieved in that, in addition to an input part for information to be called in by the central control unit and to be processed thereby, the input/output memory of the central control unit contains an output part which is subdivided into output sub-memories which are assigned to the sub-central devices and which serve for the intermediate storage of information worked up by the central control unit and to be distributed to the sub-central devices. Information specified from one of the sub-central devices are transmitted from the same with an auxiliary criterion for the input/output control device in addition to the address of the other, destination sub-central device, the auxiliary criterion causing the appertaining information instead of being input into the input part, on the contrary is input into that output sub-memory which is assigned to that sub-central device for which the appertaining information is specified.

The present invention creates the possibility of designing the information exchange between sub-central devices in such a manner that the problems of an assignment of a central data bus, on the one hand, for the information transmission operations to and from the central control unit and, on the other hand, for information transmission operations between the sub-control units can be avoided. Nonetheless, however, the workload caused by an information transmission between the sub-central devices is kept away from the central control unit. The invention has quite special significance for the retransmission of switching identifiers in the telecommunication exchange systems. In a conventional telecommunication system, particularly a telephone exchange system, such switching identifiers usually occur on the individual lines as pulse-shaped d.c. signals or as d.c. signals having a longer duration, and occur in such a manner that the individual line leads (a, b, if necessary c) of such a line exhibit specific potentials in various combinations. Thereby, two possible potential conditions are provided for each line lead. Thus, for example, numerical dial switch identifiers within a conventional exchange system are forwarded in such a form over the a-lead that ground potential is applied to the a-lead in the rhythm of the dial switch pulses. The so-called final character which is generated in the exchange when a called subscriber hangs up the receiver at the end of a call appears in the form "voltage at b-lead and ground at a-lead". When such switching identifiers are to be transmitted between locations of a telecommunication system lying at a greater or lesser distance from one another and connected to one another either on a dedicated basis or on a case-by-case basis, then, if necessary, a conversion of the switching identifiers into a form of representation suitable for such transmission occurs. In conventional telecommunication systems, the transmission channels in which such switching identifiers can be transmitted are generally a matter of transmission channels which are spatially separated from one another. Time-division multiplex telecommunication systems have increasingly become of interest, i.e. telecommunication systems in which the information to be respectively transmitted between the individual terminal locations or intermediate transmission locations connected, under certain conditions, to one another on a case-by-case basis, are modulated onto pulse sequences which are chronologically offset relative to one another and, therefore, can be chronologically grouped by nesting on TDM lines. Therefore, the individual transmission channels are chronologically separated from one another (time channels). A switching identifier control unit has been disclosed in the British Specification No. 1,040,833 for a pulse code modulation (PCM) time-division multiplex exchange, the switching identifier control unit being provided for the acceptance and the subsequent retransmission of such switching identifiers. A control unit load connected to such a switching identifier retransmission, however, can, under certain conditions lead relatively quickly to a blocking of the switching identifier control unit for the processing operations to be executed by that unit per se, so that such control units are hindered in meeting their actual tasks, are not available concerning a part of their working capacity for accepting switching identifiers intended for the appertaining exchange and processing or, respectively, generating and emitting switching characters departing the exchange. Therefore, they cannot meet their actual tasks without influence by switching identifiers only to be transmitted over the appertaining exchange but, rather, are subject to an additional load as a result of the retransmission of switching identifiers. It is standard in TDM telephone exchange systems (as described, for example, in the periodical "Telcom Report", Vol. 4/1981/supplement) to accept the signaling sub/information assigned to the time channels of each of the TDM lines and serving for the signaling of switching identifiers with the assistance of a decentralized control device of a line trunk group (LTG) (the same also applies to analog trunk lines and to analog subscriber lines) and to forward the same to a central control unit. The central control unit processes the signaling sub-information and designatially forwards the same to those decentralized control devices of those line trunk groups over which the connections were relayed which extend over the time channels belonging to the TDM line. The present invention is of particular significance for these technical interrelationships and creates the possibility of keeping the data which only serves retransmission of switching identifiers away from the central control unit, the data to be respectively retransmitted from the decentralized control device of one line terminating group to a decentralized control device of a different line terminating group.

BRIEF DESCRIPTION OF THE DRAWING

Other objects, features and advantages of the invention, its organization, construction and operation will be best understood from the following detailed description, taken in conjunction with the accompanying drawing, on which there is a single FIGURE which is a schematic representation of a circuit arrangement constructed in accordance with the present invention.

The exemplary embodiment of the invention illustrated on the drawing is only shown in terms of those components which significantly contribute to an understanding of the invention. The following discussion first turns to the general operational sequences of a PCM telephone exchange system constructed in accordance with the invention, and the individual qualities of the exchange system are later set forth.

Referring to the drawing, a switching matrix is constructed in three switching matrix stages RZE, R and RZA and exhibits a larger plurality of matrix connection sets at its input side, of which one is illustrated and referenced A. The switching matrix comprises a plurality of switching matrix parts. Of such parts, only the switching matrix part K is shown. The matrix parts are connected to one another via TDM intermediate lines in a manner similar to that illustrated in the German Letters Patent No. 20 55 745, corresponding to U.S. Pat. No. 3,924,081, or in the German Letters Patent No. 18 12 191, which corresponds to British Specification No. 1,260,769. Each of the matrix connection sets always comprises a pair of TDM lines of which the one TDM line serves for signal transmission to the switching matrix and the other TDM line serves for signal transmission from the switching matrix. Accordingly, the matrix connection set A comprises a TDM line A1 and a TDM line A2. The respective signal transmission direction for each of these TDM lines is indicated by a corresponding arrow.

The switching multiples of the first switching matrix stage RZE are combined time slot/space slot multiples, as illustrated by the symbolic showing thereof. The switching multiples of the center switching matrix stage R are space slot multiples. The switching multiples of the last switching matrix stage RZA and the first stage RZE are space slot/time slot multiples. A larger plurality of such multiples is provided in each switching matrix stage, although only three multiples of the specified time are respectively illustrated per switching matrix stage. The switching multiples of the various switching matrix stages are connected to one another via intermediate lines as illustrated on the drawing. These intermediate lines are TDM intermediate lines. Likewise, the matrix connection sets are TDM matrix connection sets.

Line trunk groups, for example, the line trunk group LTG1 are individually connected to the matrix connection sets, for example the connection set A, of the switching matrix part K, via TDM lines, for example the TDM line Ltg1 respectively designed for both message transmission directions. Such a line trunk group can be connected at its input side with subscriber lines (analog), with analog trunk lines and with PCM trunk lines (alternatively as well as in combination). A subscriber station T1 is connected to the line trunk group LTG1. Contained in a line trunk group are encoders, decoders, multiplexers, demultiplexers and the devices required for a realization of the so-called BORSCHT functions (cf. NTZ, Vol. 33/1980, No. 10, pp. 646–652 and 1978 International Zurich Seminar on Digital Communications, Proceedings IEEE Catalog, No. 78 CH 1325-0 ASST., pp. B2-1, A4.1, as well as the German applications Nos. P 31 00 811.9, P 31 04 002.0 and P 31 06 903.7.

The line trunk group LTG1 is illustrated on the drawing along with other components. Its structure and manner of operation are extensively described in the German published application No. 28 26 113, which corresponds to the Republic of South Africa letters patent No. 79/2960. Further explanations presume this structure to be known and are limited to the interrelationships which are of particular consequence in the present case.

In addition to other components, a central control unit ZW serves to complete call connections by way of the switching matrix. It determines the exchange data required for the completion of each connection. As is known, the exchange data for a connection to be through-connected precisely specify the course of the appertaining connection over the switching matrix, i.e. the switching multiples and intermediate lines traversed by the connection, as well as the channels respectively occupied therein. These exchange data are worked up with the assistance of the central control unit which thus, among other things, also exercises the function of a link-finding device in addition to that of a seizure memory, and transmits the data to the switching matrix setting devices KE of the switching matrix parts, for example the part K. The data flow transmitting the exchange data from the central control unit ZW to the switching matrix setting devices occurs by way of buffers MB1, MB2 . . . MB8 connected to the central control unit over data lines, for example the line F, the buffers serving the purpose of an intermediate storage and code conversion of data as well as matching of transmission rates. The buffers can be restricted to a portion of these functions or to only one of these functions. Such a buffer is extensively described, for example, in the German Letters Patent No. 15 37 849, which corresponds to U.S. Pat. No. 3,665,110.

In addition to the central control unit ZW, a larger plurality of decentralized control devices GP1-GPn is illustrated, the devices being respectively individually assigned to the line trunk groups LTG1-LTGn. These control devices serve for the execution of all switching operations within each of the line trunk groups. Particularly included among these switch operations are all exchange operations within the line trunk groups. Further details concerning the same can be taken from the aforementioned German published application No. 28 26 113, which corresponds to the Republic of South Africa Letters Patent No. 79/2960.

The decentralized control devices GP1-GPn are connected to the central control unit ZW via data channels which are individually through-connected per decentralized control device over the switching matrix (K) up to the buffers, such as the buffer MB2. Therefore, a respective separate data channel leads to each of the decentralized control devices from the buffers, namely from its data head ML2. To this end, the data head MO2 of the MB2 is connected via a TDM line m to one of the matrix connection sets. The buffer is connected to one of the matrix connection sets of the switching matrix in the same manner as each of the line trunk groups LTG1-LTGn. Therefore, the TDM line m is connected to a matrix connection set which comprises a TDM input to a space slot/time slot multiple of the first switching matrix stage and a TDM output from a space slot/time slot multiple of the last matrix stage. Therefore, the TDM line m is connected to a matrix connection set like the one referenced A.

Each data connection between the data head of a buffer and each of the line trunk groups, for example the line trunk group LTG1, comprises a channel for the transmission of data from the buffer to the appertaining line trunk group and a further channel for the transmission of data in the reverse direction. These two data channels lead to and from the centralized control device individually assigned to the appertaining line trunk group.

The completion and the maintenance of the above-explained data connections over the switching matrix occurs with the assistance of the switching matrix setting device in the same manner as the completion and the maintenance of the message connections, for example telephone connections. To this end, holding memories are assigned, in a known manner, to the switching multiples of the switching matrix, the exchange data respectively appertaining to a switching multiple being stored in these holding memories. What is accomplished with the assistance of the holding memories is that the necessary through-connections are available in the respective time slots or, respectively, the required write operations of the time slot multiples occur. All further details which relate to the structure and manner of operation of a TDM switching network are presumed here to be known and are therefore not described in further detail.

As explained above, the exchange data required for the completion of message connections are transmitted from the central control unit over the buffers to the switching matrix setting device. Serving this purpose, among other things, is a data head, for example the data head MK2 which is assigned to the respective buffer, for example the buffer MB2. It should be pointed out for the sake of completeness that a plurality of switching matrix setting devices can also be connected to a buffer. These multiple switching matrix setting devices can be individually assigned to a plurality of switching matrix parts of a larger switching matrix. It is also possible to provide a respective switching matrix setting device per switching matrix stage.

Since the data connections described above must be through-connected between the buffer over the appertaining TDM line m to each of the line trunk groups LTG1-LTGn with the assistance of the switching matrix K before the completion of message connections can be undertaken, for example telephone connections, a completely free switching matrix is usually available for the completion of these data connections, i.e. a switching matrix in which all channels are unoccupied. Therefore, the completion of the data connections can occur according to an arbitrarily-fixed pattern which remains unchanged for all times. It is therefore provided that each of the switching matrix setting devices, for example the device KE, also contains setting data, i.e. thus, the exchange data, stored for the data channels in a memory, for example the memory V, assigned thereto. Given a read-completion of the data connections, therefore, these exchange data need not be respectively newly processed by the central control unit ZW and need not be retransmitted over the buffers. When the data connection is required between each of the buffers and the line trunk groups, for example, LTG1-LTGn, are to be recompleted over the switching matrix K, then the central control unit merely emits a corresponding instruction to the buffers, which the same forward to the switching matrix setting device and on the basis of which the latter takes the exchange data stored in its respective memory V in order, in a known manner, to successively execute the individual exchange operations required for the completion of the individual data connections.

As is already set forth in the aforementioned German published application No. 28 26 113, corresponding to the Republic of South Africa Letters Patent No. 79/2960, the afore-mentioned data connections between the decentralized control devices, for example the decentralized control device GP assigned to the line trunk groups, for example the line trunk group LTG1, on the one hand, and the central control unit ZW, on the other hand, are also produced over the time channel coupler TSU of the line trunk group LTG1 in addition to message connections from and to subscriber locations, as well as junction lines. The data connections, as already explained, further extend over the switching matrix and the TDM line m.

As already mentioned above, in addition to subscriber lines, trunk lines (analog trunk lines and/or TDM trunk lines) are also connected to the line trunk groups. The line trunk groups LTG2 and further line trunk groups, up to LTGn, are designed in the same manner as the line trunk group LTG1.

The decentralized control devices GP cooperate in receiving and transmitting switching identifiers concerning the connected subscriber lines and trunk lines. Information corresponding to the switching identifiers are formed given switching identifiers to be received over a subscriber line and/or trunk line and are transmitted to the central control unit. For switching identifiers to be transmitted over subscriber lines and/or trunk lines, the central control unit supplies corresponding data to the appertaining, decentralized control device which then accomplishes the formation and transmission of the appertaining switching identifier.

A trunk line Vx is connected to the line trunk group LTG2 over a line terminating circuit Vz and constitutes an analog trunk line. The trunk line Vx leads to a telephone exchange system of a conventional type. As explained above, switching identifiers are transmitted in conventional telephone exchange systems in the form of d.c. pulses (a.c. pulses as well). Thereby, it can be a matter of the start character, the end character, charge rate pulses, the end of dial character and the like. The structure and manner of operation of conventional telephone exchanges is described in great detail in the books "Landesfernwahl" and "Landesfernwahl II" by R. Führer, Verlag R. Oldenbourg, Munich, as are devices for transmitting switching identifiers, particularly charge rate pulses, to be forwarded over analog trunk lines, being transmitted as d.c. signals and over current paths through-connected simultaneously with the message paths, for example voice circuits, and being through-connected like these circuits for connection (four-wire EMK) technology). When a connection from a telephone exchange illustrated on the drawing is completed over its switching matrix and the analog trunk line Vx to a subscriber connected to a conventional telephone exchange, then switching identifiers which are transmitted back over the analog trunk line Vx and arrive in the line terminating circuit Vz are finally to be conducted to the decentralized control device GP1 of the line trunk group LTG1; that, thus, is the decentralized control device of that line trunk group which is assigned to the subscriber line connected over the switching matrix K to the analog trunk line Vx in the calling case under consideration.

In the completion of such connections from a subscriber line (for example, the subscriber line assigned to the subscriber location T1) over the switching matrix K and an analog trunk line, for example the line Vx, as well as a switching device, for example the line terminating circuit Vz assigned to the connection, it is provided that the required retransmission of the switching identifiers which, for example, arrive over the trunk line Vx in the connection-associated line terminating circuit Vz and are to be supplied to the Vz and are to be supplied to the appertaining, decentralized control devices, for example the control device GP1, is accomplished with the assistance of the buffers MB1-MB8. Further, the central control unit is equipped with an input/output device G which serves the same purpose as the input/output device described in the aforementioned German Letters Patent No. 20 55 745, which corresponds to U.S. Pat. No. 3,924,081, and is referred to here as a "collecting memory". This device, therefore, has the task of accepting information coming from the decentralized control devices and intended for transmission to the central control unit and to retransmit the same to the central control unit ZW. Further, the input/output device G also has the task of retransmitting information worked up by the central control unit ZW over the buffers MB1-MB8 to the decentralized control devices, i.e. the task of distributing such information. In addition, the input/output device, in the sense of the present invention has the task of retransmitting information obtained from a decentralized control device and intended for a different decentralized control device while by-passing the central control unit.

The input/output device G includes an input portion which comprises input sub-memories C1-C8 which are individually assigned to the buffers MB1–MB8. It is also possible to forego a subdivision of the input portion into a plurality of input sub-memories.

Incoming information from the decentralized control devices over the buffers MB2–MB8 and intended for retransmission to the central control unit ZW first proceed into a transmission and reception device B of the input/output device G. Among other things, the information respectively contain the address of the decentralized control device from which they derive. The information then proceed to a write device S over the idle side of a transfer device u, the write device S writing the information in succession into the input portion of the input/output memory (C1–C8) of the input/output device G. With the assistance of a read device H, the central control unit ZW is capable, in a manner known per se, and not described herein in detail, of calling in the information from the input portion (C1–C8) of the input/output memory of the input/output device G. Therefore, the central control unit successively accepts the information stored in the input portion in succession and processes the same in a known manner.

Information worked up by the central control unit ZW and intended for the decentralized control devices GP of the line trunk groups LTG are stepped into the output portion D1–D8 of the input/output device G by the central control unit ZW with the assistance of a write device E1. This information contain the addresses of the respective decentralized control device for which they are intended. Since the decentralized control devices are permanently assigned to specific buffers (MB1–MB8), the input/output device G, on the basis of the respective address of the appertaining decentralized control device, is capable of perceiving over which of the buffers MB1–MB8 an information is to be directed. Accordingly, the write device E1 writes the appertaining information into that output sub-memory D1–D8 which is permanently assigned to the appertaining buffer, for example the buffer MB2. Therefore, only such information are always written into the output sub-memory D2 as are intended for the decentralized control devices which are assigned to the buffer MB2. With the assistance of a read device L, the input/output device G calls the information from the output sub-memories D1–D8 and forwards the same for transmission over the transmitting and receiving device B. Thereby, the address of the appertaining decentralized control device attached to the respective information determines over which of the buffers MB1–MB8 an information will be transmitted. The possibility also exists of allocating respective separate read devices (L) to each of the individual output sub-memories D1–D8. By so doing, it is made possible that operations of the information transmission over the various buffers MB1–MB8 can be simultaneously sequenced. In this case, therefore, the receiving and transmitting device B would also have to be correspondingly sectionalized.

The information transmitted to the buffers MB1–MB8 are retransmitted in the manner already described above to the decentralized control devices or to the appertaining switching matrix setting device (KE).

When an information which is transmitted by a decentralized control device over the buffer assigned thereto it is a matter of an information for the retransmission of switching identifiers (these interrelationships having already been extensively described above), i.e. a matter of an information which is only to be transmitted to a different decentralized control device and, thus, is not intended for further processing by the central control unit ZW, then, in addition to the address of that decentralized control device for which it is intended, an auxiliary criterion is attached to that information. The information now proceeds to the input/output device G. On the basis of the auxiliary criterion, and with the assistance of its transmitting and receiving device B, the input/output device G perceives that it is a matter of an information which is not to be forwarded to the central control unit but, rather, to a different decentralized control device. On the basis of the auxiliary criterion, the transfer device u is actuated in the input/output device, whereby the transmitting and receiving device B is connected to the write device E2 instead to the write device S. The information now proceeds to the write device E2 which, on the basis of the address of that decentralized control device for which the information is intended and which is attached to the information, perceives which of the buffers MB1–MB8 is assigned to the destination decentralized control device. On the basis of this address, the write device E2 writes this information into that output sub-memory, for example the sub-memory D2, which is assigned to the buffer in question, for example the buffer MB2, which corresponds to the decentralized control device which is intended to receive the appertaining information. Therefore, the auxiliary criterion induces the input/output device G to input the appertaining information into that output sub-memory which is assigned to the buffer over which the appertaining information is to be directed, instead of into the input/output memory of the input/output device G.

Although I have described my invention by reference to a particular illustrative embodiment thereof, many changes and modifications of the invention may become apparent to those skilled in the art without departing from the spirit and scope thereof. I therefore intend to include within the patent warranted hereon all such changes and modifications as may reasonably and properly be included within the scope of my contribution to the art.

I claim:

1. In a circuit arrangement for a telecommunication exchange system of the type in which a central control unit transmits information to and receives information from sub-central devices over individually assigned lines or time division multiplex channels, in which the central control unit is provided with an input/output device for receiving information called in by the central control unit for processing, and in which an input/output memory is provided for the information exchange between the sub-central devices and between the control unit and the sub-central devices, the improvement wherein:

the information memory comprises an input/output control, an output part divided into output sub-memories and an input part likewise divided into input sub-memories, for information to be fetched by the central control unit and operable to intermediately store information worked up by the central control unit to be distributed to the sub-central devices and information to be output by a first sub-central device to a second sub-central device together with a respective address identify the second sub-central device via the input/output control, means providing that the information to be emitted from the first sub-central device and destined for the second sub-central device unchanged and serving for signaling of call-associated switch identifiers which have arrived in the first sub-central device and are to be transmitted via the second sub-central device are transmitted by the first sub-central device to said input/output control with an auxiliary criterion in addition to the destination address, the auxiliary criterion causing the input/output control to input the information into the output sub-memory assigned to the destination sub-central device.

* * * * *